United States Patent

[11] 3,609,754

[72] Inventor Richard E. Riebs
Hales Corners, Wis.
[21] Appl. No. 807,560
[22] Filed Mar. 17, 1969
[45] Patented Sept. 28, 1971
[73] Assignee McGraw-Edison Company
Elgin, Ill.

[54] POSITION-ENCODING DEVICE WITH FREQUENCY CODED OUTPUT SIGNALS
13 Claims, 4 Drawing Figs.

[52] U.S. Cl. .......... 340/347 P, 340/151, 340/207R, 340/357
[51] Int. Cl. .......... G08c 9/06
[50] Field of Search .......... 340/347 PR, 357, 147, 150, 151, 177, 207 R, 208; 331/137

[56] References Cited

UNITED STATES PATENTS

| | | | |
|---|---|---|---|
| 2,627,596 | 2/1953 | Andrews | 331/137 X |
| 3,047,662 | 7/1962 | Smith | 340/347 X |
| 3,223,995 | 12/1965 | Brothman et al. | 340/347 |
| 3,229,278 | 1/1966 | Hanson et al. | 340/347 |
| 3,253,153 | 5/1966 | Stoddard | 340/347 UX |
| 3,358,279 | 12/1967 | Chope | 340/347 |
| 3,451,053 | 6/1969 | Xenis et al. | 340/347 |
| 3,472,978 | 10/1969 | Granata et al. | 340/357 X |
| 3,278,927 | 11/1966 | Vlasenko et al. | 340/347 |
| 3,349,406 | 10/1967 | Perry et al. | 340/347 |
| 3,357,011 | 12/1967 | Diaz | 340/347 |
| 3,231,670 | 1/1966 | Lane et al. | 340/207 X |

*Primary Examiner*—Maynard R. Wilbur
*Assistant Examiner*—Michael K. Wolensky
*Attorney*—Richard C. Ruppin

ABSTRACT: This invention relates to a position encoder for use in an automatic remote meter-reading system including a pair of coded discs each having a plurality of groups of position-coding elements. A plurality of photocells are disposed between the discs and are arranged to be selectively energized from their opposite sides by individual-illuminating means associated with each disc. The presence or absence of illumination on each photocell is operative to modify the parameters of an oscillating circuit so that the circuit has a different frequency for each position of the coded discs.

Inventor:
Richard E. Riebs
By Richard C. Ruppin
Atty.

Fig. 2.
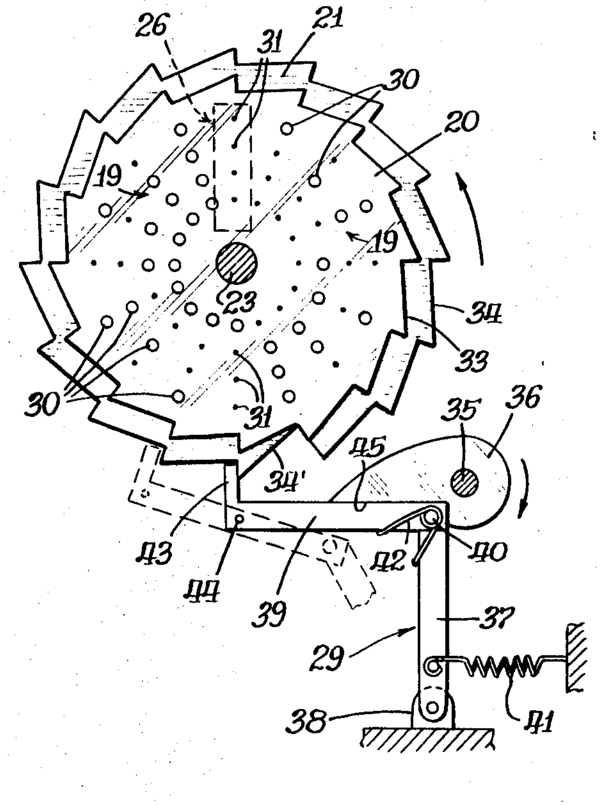
Fig. 3.
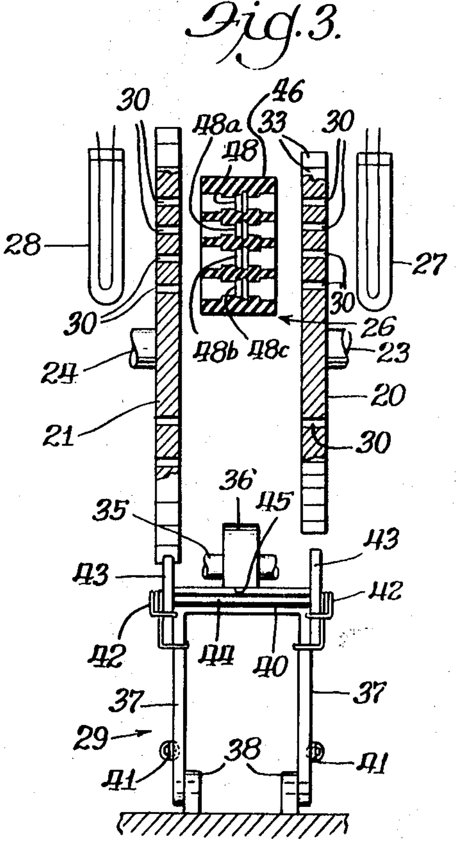
| POS. | BINARY CODE | | | |
|---|---|---|---|---|
| 1 | • | • | • | • |
| 2 | • | • | • | o |
| 3 | • | • | o | • |
| 4 | • | • | o | o |
| 5 | • | o | • | • |
| 6 | • | o | • | o |
| 7 | • | o | o | • |
| 8 | • | o | o | o |
| 9 | o | • | • | • |
| 10 | o | • | • | o |
| 11 | o | • | o | • |
| 12 | o | • | o | o |
| 13 | o | o | • | • |
| 14 | o | o | • | o |
| 15 | o | o | o | • |
| 16 | o | o | o | o |
Fig. 4.
Inventor:
Richard E. Riebs
By Richard C. Ruppin
Atty.

POSITION-ENCODING DEVICE WITH FREQUENCY CODED OUTPUT SIGNALS

BACKGROUND OF THE INVENTION

This invention relates to a position-indicating device for determining the relative position between two relatively movable members.

In particular, the invention has application in an encoding device and more particularly to a device for converting an analog quantity representing the position of a shaft or other device to a digital quantity for transmission to a remote location. Encoding devices of this type may be employed, for example, in systems for the automatic remote reading of utility meters from a central station and numerically controlled machinery.

Utility meters, such as electric, gas and water meters are generally widely distributed at the customers's points of usage. It is the present practice in the reading of such meters for a meter reader to visit each customer site and to observe and record the registration on each unit. While there have been a large number of proposals for the automatic reading of such meters from a remote location, they have not been commercially adopted because of their high cost and because they could not meet the limitations imposed by existing utility meters and communication systems. Such limitations include the relatively confined space and drive torques available for encoding devices in utility-metering equipment presently installed.

It is an object of the invention to provide an economical position encoding and indicating device.

Another object of the invention is to provide an encoding device which may be incorporated into a relatively confined space.

Another object of the invention is to provide an encoding device which requires a relatively small drive torque.

A further object of the invention is to provide a position encoding and indicating device which produces an output pulse having a frequency or repetition rate indicative of the position of a movable member.

These and other objects and advantages of the instant invention will be apparent from the description of the preferred embodiment hereinbelow.

SUMMARY OF THE INVENTION

The objects of the invention are accomplished by providing first, second and third means respectively having first, second and third plurality of code units which are relatively movable to a plurality of positions along a predetermined path. The first and third plurality of code units cooperate to produce a different position indication for each position along the path. The second and third means cooperate similarly. The third means includes means for producing an output signal which varies with the produced indication.

BRIEF DESCRIPTION OF THE DRAWINGS

FIGS. 2 and 3 illustrate two different views of an embodiment of the instant invention; and FIG. 4 is a table illustrating an example of the binary code produced by the coded discs shown in FIGS. 1–3.

DESCRIPTION OF THE PREFERRED EMBODIMENT

Figure 1:
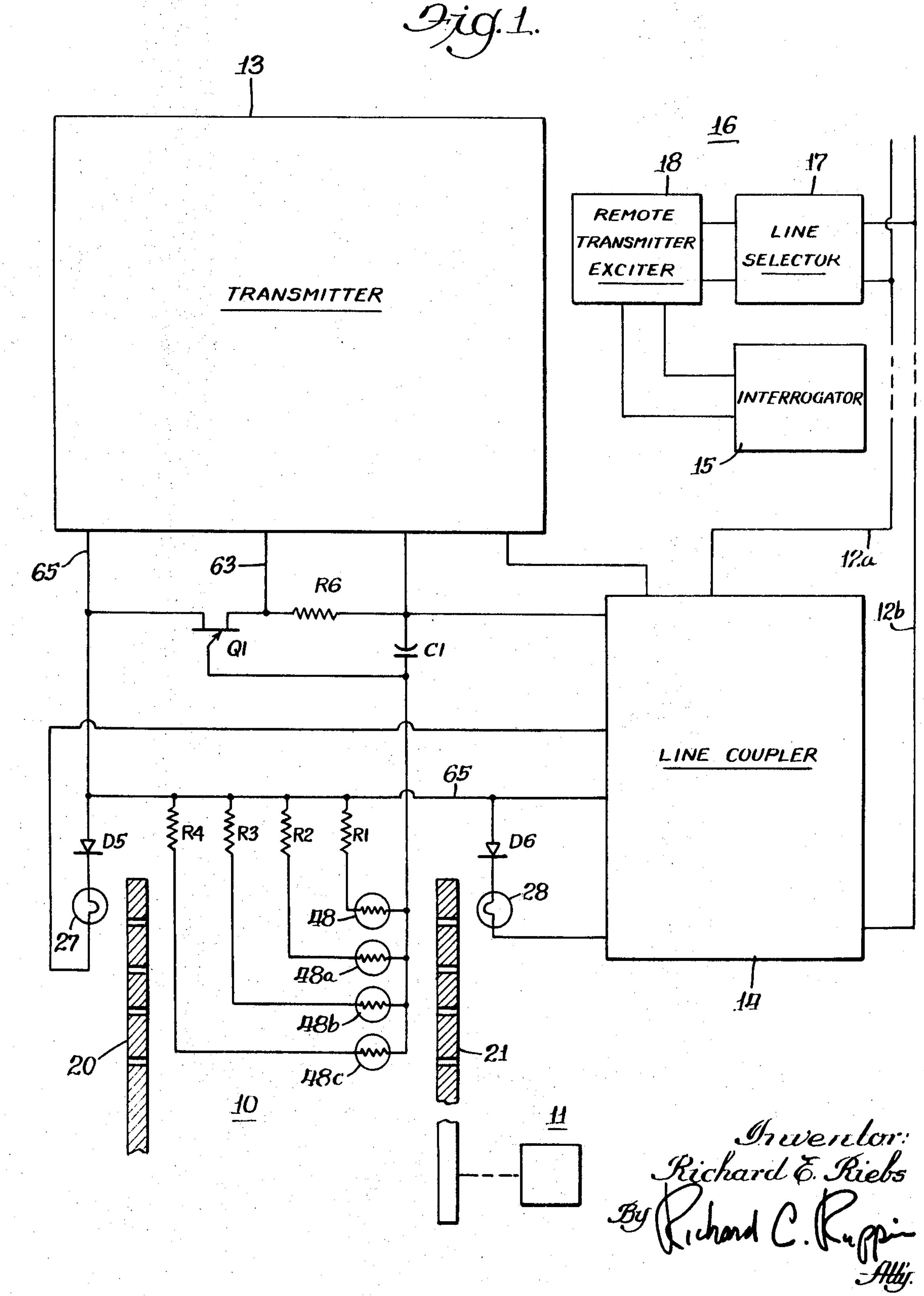
FIG. 1 shows a remote meter-reading system in which the encoding and indicating device according to the instant invention may be incorporated.

FIG. 1 shows an automatic remote meter-reading system in which the encoder 10 according to the instant invention is employed. The encoder 10 is mechanically coupled to the meter 11 which is to be read and to the customer's telephone lines 12 through a transmitter 13 and a line coupler 14. An interrogator 15 at the telephone exchange 16 is coupled to the lines **12*a* and 12*b* through a line selector 17 and a remote transmitter exciter 18**.

The details of the meter 11, the transmitter 13, the coupler 14, the interrogator 15, the line selector 17 and the remote transmitter exciter 18 form no part of the instant invention and, accordingly, will not be discussed in detail. It is sufficient for purposes of understanding the instant invention to note that when it is desired to read the meter 11, the interrogator 15 is actuated to in turn actuate the line selector 17 and the remote transmitter exciter 18. The line selector 17 couples the interrogator 15 and the remote transmitter exciter 18 to the lines **12*a* and 12*b*. The remote transmitter exciter 18 sends an interrogation command which may comprise a positive DC signal through one of the lines 12*a* and 12*b* which actuate the line coupler 14, whereby the encoder 10 and the transmitter 13 are coupled to the lines 12*a* and 12*b* and actuated. The encoder 10 provides the transmitter 13 with coded information relative to the meter 11 registration, and the transmitter 13, in turn, transmits the information through the lines 12*a* or 12*b* to the interrogator 15. The transmitter 13** may take the form of an oscillator, and the encoder may interrupt the operation of the oscillator as a function of meter registration.

For a more complete description of a transmitter 13 and line coupler 14 usable with the instant invention, reference is made to copending application Ser. No. 691,020, filed Dec. 15, 1967, now U.S. Pat. No. 3,491,244 and assigned to the assignee of the instant invention.

FIGS. 2 and 3 show the encoder device 10 in greater detail to include a pair of coded discs 20 and 21 which are respectively mounted for rotation about central shafts 23 and 24, a sensor assembly 26 positioned between discs 20 and 21, a pair of lamps 27 and 28 and a drive assembly 29 for coupling the discs 20 and 21 to the meter being read.

The discs 20 and 21 are provided with an array of coding units, four coding units being provided for each disc position. In the illustrated embodiment, wherein each of the discs 20 and 21 has 16 positions, 64 coding units are provided on each disc. Also, where the sensor assembly 26 is photosensitive, the coding units comprise transparent positions or holes 30 and opaque or unperforated positions 31. As seen in FIG. 2, the coding units 30 and 31 are arranged in a radially spaced array on the disc 20 with a portion of the total number of coding units 30 and 31, designated as groups 19 located at each of the 16 segments or positions of the disc. A similar array of coding units 30 and 31 are arranged on the disc 21. As each of the discs 20 and 21 rotate, their groups 19 of code units 30 and 31 describe a circular path about their respective shafts 23 and 24. As will be pointed out more fully hereinbelow, the arrangement of holes 30 and unperforated positions 31 in groups 19 are such that, when used with at least a four-unit sensor assembly 26, an unambiguous code will be provided for each of the 16 positions of the discs 20 and 21.

In addition, the outer periphery of each of the discs 20 and 21 may be provided with 16 teeth 33 and 34, respectively, which are cooperatively engageable by the drive assembly 29. One of the teeth 33 and 34 may be disposed adjacent one of the coding units 30 and 31 on their respective discs 20 and 21.

The drive assembly 29 includes a scroll cam member 36 which is fixed to a shaft 35 coupled to the meter being read. The cam 36 cooperatively engages a pawl assembly for stepping the discs 20 and 21 and which comprises a first pair of parallel links 37 having one end pinned at a fixed pivot point 38 and a second pair of links 39 pivotally coupled to the other end of links 38 by knee pin 40. Springs 41 hold pin 40 in resilient engagement with the cam 36 and springs 42 tend to produce clockwise rotation of links 39 to urge fingers 43 carried by their free ends into engagement with the teeth 33 and 34 on discs 20 and 21.

The diameter of the disc 21 is sufficiently greater than that of the disc 20 so that the radially outward extremity of disc 20 does not extend to the innermost portion of the teeth 34. As a result, one of the fingers 43 will engage the teeth 34 on disc 21 but the other finger 43 will normally be held out of engagement with the teeth 33 of disc 20 by a pin 44 which couples the ends of links 39. However, one of the teeth 34 on the disc 21, designated 34′, is deeper than the remaining teeth so that the teeth 33 on disc 20 will extend past its inner extremity.

As those skilled in the art will appreciate, the cam member 36 may be coupled to the meter 11 by a gear drive (not shown) in such a manner that the cam member 36 will make one revolution for each of a predetermined number of revolutions in the meter assembly (not shown). As the cam member 36 rotates clockwise, as seen in FIG. 2, the links 37 and 39 are moved from their full to their phantom position wherein the finger 43 will move into engagement with the succeeding ones of the teeth 34 on disc 21. As the cam member 36 completes one revolution, wherein its flat portion 45 is moved into engagement with the pin 40, the spring 41 will rapidly return links 37 and 39 to their full position, thereby moving the disc 21 one position in the counterclockwise direction. The disc 20 will remain stationary, however, because the other finger 43 will be held out of engagement with its teeth 33 by the larger outer periphery of the disc 21 and the pin 44.

After the disc 21 has completed one revolution wherein the tooth 34′ is in a position to be engaged by the one finger 43, the greater depth of tooth 34′ will allow engagement between the other finger 43 and one of the teeth of the disc 20. In this manner, the disc 20 will be moved one position for each complete revolution of the disc 21.

As seen in FIGS. 2 and 3, the sensor assembly 26 may comprise an elongated head member 46 of an opaque material which is disposed axially and adjacent to the discs 20 and 21. When the 16-position disc having a group of code units 19 at each position or segment is provided, the sensor assembly 26 includes at least four sensor units 48, 48*a*, 48*b*and 48*c* which may be spaced along the elongated head 46 at one of the positions of the discs 20 and 21. In the illustrated embodiment, the sensor units 48–48*c* are spaced radially of the central shafts 23 and 24 and opposite the coding units 30 and 31 of a group 19.

As a result of the above described arrangement, for each position of the discs 20 and 21, one of the sensor units 48–48*c* will face one of the coding units 30 or 31 in each of the discs 20 and 21. The lamps 27 and 28 are disposed adjacent the outer surfaces of each of the discs 20 and 21 and in an opposed relation to the sensor assembly 26. As will be pointed out more fully hereinbelow, the lamps 27 and 28 are connected to be sequentially energized so that the sensor units 48–48*c* will be selectively energized through the holes 30 in the discs 20 by light emitted from the lamp 27 and then from the opposite side through holes 30 in the disc 21 by light emitted from the lamp 28. The position code for the disc 20 will be determined by which ones of the sensor units 48–48*c* are energized when the lamp 27 is lit and, similarly, the position code for the disc 21 will be determined by which ones of the sensor units 48–48*c* are illuminated when the lamp 28 is lit. It will be understood that only those sensor units 48–48*c* which are opposite a hole 30 in the appropriate one of the discs 20 or 21 will be illuminated, while those adjacent an unperforated position will remain unenergized. For a more complete description of the sensor units 48–48*c*, reference is made to copending application Ser. No. 691,050, filed Dec. 15, 1967, and assigned to the assignee of the instant invention.

If the position of the discs 20 and 21 shown in FIG. 2 is taken as a first position, none of the photocells 48–48*c* will be illuminated when the lamps 27 and 28 are lit. When the discs 20 and 21 are stepped counterclockwise to their next positions, only the photocells 48–48*c* opposite the outermost hole 30 in the discs will be illuminated. As the discs 20 and 21 are respectively stepped clockwise through each of their 16 positions, a different combination of the photocells 48–48*c* will be illuminated, providing the 16-position unambiguous code for each disc 20 and 21 shown in FIG. 4.

While a particular arrangement of holes 30 has been illustrated, it will be appreciated that this is only illustrative and that other unambiguous 16-position codes can also be obtained by appropriate modification of the arrangement of holes 30 and unperforated positions 31.

As may be seen in FIG. 1, the photocells 48, 48*a*, 48*b* and 48*c* are respectively connected in series with the resistors R1, R2, R3 and R4. The serially connected combination of resistors and photocells are connected in parallel and the parallel combination is, in turn, connected in series with capacitor C1. The opposite ends of the serial combination of the photocells, resistors and capacitor C1 are connected through transmitter 13 to the DC voltage source supplied through the telephone lines 12*a* and 12*b* from the remote transmitter exciter 18 when it is desired to obtain information from the encoder 10. A unijunction transistor Q1 has its base-one-base-two circuit connected in series with resistor R6 across the DC voltage source. The base-two of the transistor Q1 is connected through conductor 63 to the transmitter 13. The emitter of transistor Q1 is connected between the parallel combination of resistors R1–R4 and photocells 48–48*c* and the capacitor C1. When the photocells 48–48*c* are not illuminated, they are in a high impedance state so that the resistors R1–R4 are effectively open circuited and deenergized so that no significant charge accumulates on capacitor C1. When any one of the photocells 48, 48*a*, 48*b* and 48*c* is illuminated and assumes a low impedance state, its associated resistor is coupled to the emitter of transistor Q1 and across conductors 65 and 66 in series with capacitor C1. The capacitor C1 then charges to the potential required to trigger transistor Q1 so that transistor Q1 conducts. When transistor Q1 conducts, the potential at C1 and at the emitter of Q1 drops because the values of the resistors R1–R4 are selected such that they will not pass sufficient current to maintain conduction of transistor Q1 indefinitely after it initially conducts. The values and parallel combinations of resistors R1–R4 determine the frequency or number of times transistor Q1 conducts or pulses during a fixed interval of time. For example, the value of R1 is selected so that it, together with C1, will cause transistor Q1 to produce a low frequency having a repetition rate of one pulse during a predetermined interval of time. The resistor R2 may have a resistance equal to one-half that of R1. Therefore, if R2 alone is connected to the emitter of transistor Q1 by its photocell 48*a*, it will cause the transistor Q1 to produce a frequency having a repetition rate of two pulses per interval of time. If both R1 and R2 are connected in parallel by photocells 48 and 48*a*, the transistor Q1 will pulse at the rate of three pulses per interval of time. Resistor R3 has a value equal to one-fourth that of resistor R1. Therefore, if resistor R3 is connected alone to capacitor C1, the transistor Q1 will have an output repetition rate of four pulses per interval of time. The resistor R4 has a value equal to one-eighth that of resistor R1 and will produce an output rate of eight pulses per interval of time when photocell 48*c* is illuminated alone. It can thus be seen that the illumination of a different combination of photocells 48–48*c* at each of the 16 positions of one of the discs 20 and 21 causes the transistor Q1 to produce an output frequency having a repetition rate of from zero to 15 pulses per interval of time.

The lamps 27 and 28 are coupled through the transmitter 13 and diodes D5 and D6 to the telephone lines 12*a* and 12*b*. One of the lamps 27 and 28 is energized and illuminated when a positive DC potential is placed on line 12*a* and the other of the lamps is energized and illuminated when the positive DC potential is placed on 12*b*. The lamps 27 and 28 thus act as selecting means for determining which of the discs 20 and 21 and the coding units on the discs are utilized with photocells 48–48*c* to read the meter 11.

As pointed out more fully in said copending application Ser. No. 691,020, the output pulse of the transistor Q1 may be utilized to disable or interrupt the operation of the transmitter 13 as, for example, where the transmitter 13 takes the form of an oscillator. In this manner, the transmitter 13 will provide a relatively high frequency signal to the interrogator 15 which is interrupted a different number of times during a given interval of time for each combination of active and inactive photocells 48–48*c* and corresponding combination of energized resistors R1–R4.

While only a single arrangement of code units has been illustrated and described, it will be appreciated that a wide variety is possible without deviating from the inventive concept. Accordingly, it is not intended to limit the invention to the various embodiments, but only by the scope of the appended claims.

I claim:

1. A system for reading meters and the like comprising:

a disc connected to intermittently rotate to selected positions in response to selected amounts of movement of a meter, a coded track on the disc having transparent and opaque portions arrayed in a coded relationship and correlated to uniquely indicate each position of the disc, a sensing means for sensing the coded track comprising a group of photosensitive resistances spaced along and adjacent to the coded track on one side of the disc and a controllable light source on the other side of the disc, a control means for selectively activating the light source to thereby activate a selected group of photosensitive resistances, and an oscillator connected to be controlled by the photosensitive resistances to produce a different respective frequency in response to each different group of activated photosensitive resistances, to thereby indicate the position of the disc.

2. A system according to claim 1 also comprising a second disc similar to the first disc and connected to intermittently rotate to consecutive positions in response to each complete revolution of the first disc and having a similar coded track with coded portions.

3. A system according to claim 2 wherein said two discs rotate about the same axis and said light responsive elements are located between the discs.

4. A system according to claim 3 also comprising a second light source with said light sources each located and adjacent a different disc on the side of each disc opposite to the light responsive elements.

5. A system for reading meters comprising:

a member connected to intermittently move selected amounts in response to selected amounts of movement of a meter, a coded track on the member, a controllable light source adjacent the coded track, a group of light-responsive elements adjacent the coded track and responsive to the coded track and to the light source, a control means for activating the energy source to thereby activate selected elements determined by the response of said elements to the coded track, and an oscillator connected to be controlled by the elements to produce a different frequency in response to each respective different combination of activated elements to thereby indicate the position of the member.

6. A system according to claim 5 wherein said member is a disc intermittently rotatable about an axis to consecutive positions in response to the movement of the meter.

7. A system according to claim 6 wherein said energy-responsive elements are light responsive and are selectively spaced along and adjacent to the coded track on one side of the disc and said energy source is a controllable light source on the other side of the disc.

8. A system according to claim 7 wherein said coded portions are transparent and opaque portions correlated to uniquely indicate each position of the disc.

9. A system according to claim 6 comprising a second disc similar to the first disc and connected to intermittently rotate to consecutive positions in response to each complete revolution of the first disc and having a coded track with coded portions.

10. A system according to claim 9 wherein said energy source is a controllable light source and said energy-responsive elements are light-responsive elements.

11. A system according to claim 10 wherein said coded portions are transparent and opaque portions correlated to uniquely indicate each position of the disc.

12. A system according to claim 11 wherein said two discs rotate about the same axis and said light-responsive elements are located between the discs.

13. A system according to claim 12 also comprising a second light source with said light sources located one adjacent each disc on the side opposite to the light-responsive elements.